United States Patent
Andresen et al.

(10) Patent No.: US 9,350,152 B2
(45) Date of Patent: May 24, 2016

(54) CABLE FEEDTHROUGH AND METHOD FOR ASSEMBLING A CABLE FEEDTHROUGH

(71) Applicants: Jens Andresen, Blomberg (DE);
Thorsten Diessel, Hiddenhausen (DE);
Dennis Sprenger, Horn-Bad Meinberg (DE)

(72) Inventors: Jens Andresen, Blomberg (DE);
Thorsten Diessel, Hiddenhausen (DE);
Dennis Sprenger, Horn-Bad Meinberg (DE)

(73) Assignee: PHOENIX CONTACT GMBH & CO. KG, BLOMBERG (DE)

( * ) Notice: Subject to any disclaimer, the term of this patent is extended or adjusted under 35 U.S.C. 154(b) by 0 days.

(21) Appl. No.: 14/348,901

(22) PCT Filed: Oct. 5, 2012

(86) PCT No.: PCT/EP2012/004214
§ 371 (c)(1),
(2) Date: Apr. 1, 2014

(87) PCT Pub. No.: WO2013/050180
PCT Pub. Date: Apr. 11, 2013

(65) Prior Publication Data
US 2014/0299369 A1  Oct. 9, 2014

(30) Foreign Application Priority Data
Oct. 7, 2011  (DE) .......................... 10 2011 054 294

(51) Int. Cl.
*H02G 3/22* (2006.01)
*H02G 3/18* (2006.01)
(Continued)

(52) U.S. Cl.
CPC ................. *H02G 3/22* (2013.01); *H01R 43/20* (2013.01); *H02G 3/085* (2013.01); *Y10T 29/49117* (2015.01)

(58) Field of Classification Search
CPC ............ H02G 3/22; H02G 3/24; H02G 3/26; H02G 3/30; H02G 3/36; H02G 15/007; H02G 3/083; H01R 43/20; B60R 16/0222; B60R 16/0215; Y10T 29/49117
USPC .... 174/650, 152 G, 153 G, 135, 152 R, 72 A, 174/137 R, 142, 668, 659, 155, 156, 664, 174/657; 285/3, 4; 248/68.1, 49; 16/2.1, 2.2
See application file for complete search history.

(56) References Cited

U.S. PATENT DOCUMENTS 3,489,440 A * 1/1970 Brattberg ........................ 248/56
4,702,444 A * 10/1987 Beele .............................. 248/56
(Continued)

FOREIGN PATENT DOCUMENTS

DE        3428258 A1   2/1986
DE    102005002597 B3   8/2006
(Continued)

*Primary Examiner* — Angel R Estrada
(74) *Attorney, Agent, or Firm* — Leydig, Voit & Mayer, Ltd.

(57) ABSTRACT

A cable feedthrough includes a frame element and a sealing element. The frame element includes at least two frame parts and forms an inner chamber delimited by the frame parts. The sealing element is disposed in the inner chamber, lying adjacent to at least one of another sealing element or at least one of the frame parts. The sealing element is fixed in the frame element by a press fit. The sealing element includes a base body with a passage configured to receive a cable therethrough, and a conical cable bushing formed on the base body to extend the passage. The conical bushing including gradated stepped regions having diameters of different sizes.

12 Claims, 5 Drawing Sheets

(51) Int. Cl.
*H02G 3/08* (2006.01)
*H01R 43/20* (2006.01)

(56) References Cited

U.S. PATENT DOCUMENTS

| | | | | |
|---|---|---|---|---|
| 4,919,372 | A | * | 4/1990 | Twist et al. ............... 248/56 |
| 5,108,060 | A | * | 4/1992 | Beele ........................ 248/56 |
| 5,109,756 | A | * | 5/1992 | Barboza et al. ............... 285/4 |
| 5,422,436 | A | * | 6/1995 | Zachrai .................. 174/153 G |
| 5,783,776 | A | * | 7/1998 | Birmingham et al. ........ 174/657 |
| 5,856,635 | A | * | 1/1999 | Fujisawa et al. .......... 174/153 G |
| 6,353,184 | B1 | * | 3/2002 | Daoud ....................... 174/668 |
| 6,362,427 | B1 | * | 3/2002 | Daoud ..................... 174/152 G |
| 6,927,338 | B2 | * | 8/2005 | Shimola et al. ........... 174/152 G |
| 7,288,730 | B2 | * | 10/2007 | Habel et al. ................. 174/650 |
| 8,963,010 | B2 | * | 2/2015 | Sprenger et al. .......... 174/152 G |
| 2005/0115733 | A1 | | 6/2005 | Kreutz |
| 2009/0218132 | A1 | | 9/2009 | Delakowitz |
| 2011/0114801 | A1 | | 5/2011 | Ehmann |

FOREIGN PATENT DOCUMENTS

| | | |
|---|---|---|
| DE | 102005016340 B3 | 8/2006 |
| DE | 60311258 T2 | 7/2007 |
| DE | 102009060988 B3 | 5/2011 |
| EP | 1744425 A1 | 1/2007 |
| GB | 2337870 A | 12/1999 |

* cited by examiner

CABLE FEEDTHROUGH AND METHOD FOR ASSEMBLING A CABLE FEEDTHROUGH

LIST OF REFERENCE NUMERALS

This application is a U.S. National Phase application under 35 U.S.C. §371 of International Application No. PCT/EP2012/004214, filed on Oct. 5, 2012, and claims benefit to German Patent Application No. DE 10 2011 054 294.9, filed on Oct. 7, 2011. The International Application was published in German on Apr. 11, 2013 as WO 2013/050180 A2 under PCT Article 21 (2).

FIELD

The invention relates to a cable feedthrough. Furthermore, the invention relates to a method for assembling a cable feedthrough.

BACKGROUND

Cable feedthroughs serve to introduce pre-fabricated connectors into control cabinets or other spaces separated by bulkhead partition walls. Because the connectors can be substantially larger than the cable diameter of a cable in terms of their geometry, it is necessary to reliably seal the gap formed between the cable and the wall breakthrough permanently, in a simple manner and moreover, cost effectively. In addition, there can be a demand for as many different cables as possible to be manoeuvred in the tightest of spaces.

There are systems for inserting a cable arranged on a connector into a frame element provided with a sealing element, where the frame element is arranged on the wall breakthrough in order to seal it. In order to be able to arrange the cable in the sealing element, in particular in a passage of the sealing element, the sealing element has a slotted opening extending from the passage to the outer surface of the sealing element, via which a cable can be pushed laterally into the sealing element and positioned in the passage. If the cable is not inserted correctly and properly into the sealing element in the process or if a sealing element is selected where the passage is too large for the inserted cable, a secure sealing of the cable using the sealing element of the cable feedthrough can no longer be guaranteed.

SUMMARY

In an embodiment, the present invention provides a cable feedthrough comprising a frame element and a sealing element. The frame element includes at least two frame parts and forms an inner chamber delimited by the frame parts. The sealing element is disposed in the inner chamber, lying adjacent to at least one of another sealing element or at least one of the frame parts. The sealing element is fixed in the frame element by a press fit. The sealing element includes a base body with a passage configured to receive a cable therethrough, and a conical cable bushing formed on the base body to extend the passage. The conical bushing including gradated stepped regions having diameters of different sizes.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention provides a high degree of tightness of a cable feedthrough and additionally a simple assembly of the cable feedthrough.

In an embodiment, the cable feedthrough has a frame element formed from at least two frame parts, which forms an inner chamber delimited by the frame parts, one or more sealing elements being arranged inside this inner chamber, said elements having a base body with a respective passage through which a cable is fed, the one or more sealing elements in the inner chamber lying adjacent to a frame part and/or to another sealing element and being fixed in the frame part by forming a press-fit, one or more of the sealing elements having a conical cable bushing that is formed on the base body and extends the passage, the conical cable bushing having gradated stepped regions with diameters of different sizes.

In an embodiment, the invention provides a method for providing a sealing element, which has a base body with a passage, a conical cable bushing being formed on the base body and extending the passage, and having gradated stepped regions with diameters of different sizes In such embodiments, the method can involve shortening the conical cable bushing depending on the outer diameter of a cable to be fed through the passage into the sealing element by cutting off one or more of the gradated stepped regions, and introducing the cable into the sealing element through the passage of the sealing element. The method can also involve arranging the sealing element provided with the cable on a frame part, and connecting the frame part along with one or more additional frame parts to a frame element so that the sealing element provided with the cable is arranged inside the inner chamber of the frame element, said inner chamber being delimited by the frame parts, and is retained in the frame element by forming a press-fit.

Practical embodiments and advantageous developments of the invention are given in the sub-claims.

The In embodiments of the invention, the cable feedthrough provides a high degree of tightness. This is achieved on the one hand in that the sealing elements, in which the cables are introduced, are arranged in a frame element, which is formed from at least two frame parts, which can be assembled, in particular plugged together. As a result, a simplified arrangement of the sealing element in a frame element is possible, since the frame parts are only assembled when the correct sealing elements have been selected and arranged between the frame parts forming the frame element. The frame parts thus form the outer surface of the frame element and the sealing elements are enclosed by the frame parts. In some embodiments, the frame element is rectangular. It can, however, also have a different form, which is adapted to the wall cut-out or wall breakthrough to be blocked. The sealing elements are fixed inside the frame element in an inner chamber of the frame element formed by the frame parts by means of a press-fit. Due to the press-fit it is not necessary for the sealing elements to be arranged in an additional receiving area, which is positioned in the inner chamber of the frame element. Because the sealing elements are arranged in the inner chamber directly adjacent to a frame part and/or an additional sealing element, the number of additional components that may be necessary, such as an additional receiving area for the sealing elements, can thus be reduced to zero. The individual or a plurality of sealing elements thus serve to fill the inner chamber of the frame element so as to seal it so that there is no longer a gap between the frame element and the sealing element or between the sealing elements themselves.

Furthermore, in embodiments of the invention, the cable feedthrough includes one or more sealing elements that has/have a conical cable bushing that is formed on the base body and extends the passage, the conical cable bushing having gradated stepped regions with diameters of different sizes. The conical cable bushing can be adapted optimally to the diameter of the cable to be fed through by severing individual gradated stepped regions so that the cable can be arranged tightly sealed in the passage of the sealing element. The cable can thus be introduced directly into the passage of the sealing element from underneath along the longitudinal axis of the sealing element. It is thus no longer necessary to provide a slotted opening on the sealing element and to introduce the cable laterally into the sealing element. By severing, in particular cutting off, the gradated stepped regions to the appropriate diameter of the cable, a diameter-tolerant and secure assembly of a cable in a sealing element is possible. The arrangement of the cable in the sealing element can now already be carried out when the cable is made up before the sealing element is inserted into the frame element. Defective assembly by using an inappropriate sealing element for the cable diameter by the user himself can thus be prevented. Moreover, the assembly of the cable feedthrough according to the invention can thus be carried out a lot more easily, faster and more reliably compared to the assembly of known cable feedthroughs.

According to an embodiment of the cable feedthrough, the base body has a tubular stabilisation element inserted into the passage. The tubular stabilisation element can be formed from a dimensionally stable plastic or a metal. The stabilisation element acts in a mechanically stabilising manner in that the sealing pressure exerted by the frame element onto the sealing element, in particular onto the base body of the sealing element, forming a press-fit in the region of the passage through which the cable is fed, is absorbed by the stabilisation element in order to prevent the sealing pressure from transferring from the frame element onto the cable.

Furthermore, in certain embodiments the sealing element has a cable strain relief, the cable strain relief being formed on the base body or on the tubular stabilisation element. The cable strain relief can, for example, be formed by a web and a lug formed on the web, the web being formed on the base body or on the tubular stabilisation element. A cable tie, for example, which is guided around the outer circumference of the cable, can be arranged on the lug in order to provide strain relief for the cable.

In some embodiments, the sealing element is formed from a thermoplastic polymer or an elastomer. In the case of an embodiment of the sealing element formed from a thermoplastic polymer, such as styrene ethylene butylene styrene (SEBS), good acid and alkaline resistance as well as good alcohol resistance of the sealing element can be achieved. In the case of an embodiment of the sealing element formed from an elastomer, in particular a vulcanisate, such as nitrile butadiene rubber (NBR), the sealing element can have low plastic deformation and good resistance to hydrocarbons, oils, fuels and grease. Altogether, in some embodiments, the sealing element can have high elastic deformability so that the sealing element can be compressed by the frame elements in order to thus form a press-fit.

In order to fix the sealing element in the inner chamber of the frame element, in some embodiments, the base body of the sealing element has a first fixing region to fix the base body of the sealing element to the base body of an additional sealing element arranged adjacent to this base body and/or to fix the base body of the sealing element to a frame part, the first fixing region having a web element that is convex, projecting from the lateral surface of the base body of the sealing element. When the sealing element is fixed, the web element can, for example, press into a lateral surface of a base body of an adjacent sealing element due to the elasticity of the material of the sealing element so that a frictional adhesion is formed here using the web element between sealing elements arranged adjacent to each other to fix the sealing element.

Furthermore, the base body of a sealing element can have a second fixing region to fix the base body of the sealing element to the base body of an additional sealing element arranged adjacent to this base body and/or to fix the base body of the sealing element to a frame part, the second fixing region having a plate formed on the base body with one or more recesses. The one or more recesses can receive corresponding domes, which are formed on a frame part or a sealing element arranged adjacent to it.

Furthermore, the base body of a sealing element can have a third fixing region to fix the base body of the sealing element to the base body of an additional sealing element arranged adjacent to this base body and/or to fix the base body of the sealing element to a frame part, the second fixing region having a plate formed on the base body with one or more domes. The one or more domes can engage in recesses formed on a frame part or a sealing element arranged adjacent to it.

According to another embodiment of the cable feedthrough, it is provided for the frame parts to be connected to each other by means of screws. When connecting the frame parts using screws, the sealing elements are compressed in between the frame parts in order to form a press-fit between the frame parts and the sealing elements, whereby a high degree of tightness of the cable feedthrough is achieved. In some embodiments, the frame parts connected to each other using screws are formed from a plastic, such as polyamide (PA6.6).

As an alternative to the connection of the frame parts using screws, it can also be provided for the frame parts to be connected to each other by means of a brace element arranged in an articulated manner on a frame part. By connecting the frame parts using a brace element arranged in an articulated manner on a frame part, the operation to assemble the cable feedthrough can be simplified in comparison to the connection using screws, since in particular no additional tool such as a screwdriver is necessary to make the connection. In the case of a connection of the frame parts to each other using a brace element, a compression of the sealing elements arranged between the frame parts can also be achieved in order to form a press-fit between the frame parts and the sealing elements, thus achieving a high degree of tightness of the cable feedthrough. In some embodiments, two braces are arranged on the opposite transverse lateral surfaces of the frame element, the brace elements forming an extension of the frame element in its longitudinal expansion but, in some embodiments, not affecting the height of the frame elements. The frame elements, which can be connected to each other by means of the brace, can likewise be formed from a plastic, for example polyamide (PA6.6), a metal insert being arranged here in the plastic to stabilise the frame parts. Furthermore, it is also possible to form the frame parts from aluminium, such as AlSi12.

The invention is described in more detail below with reference to the drawings.

Figure 1:
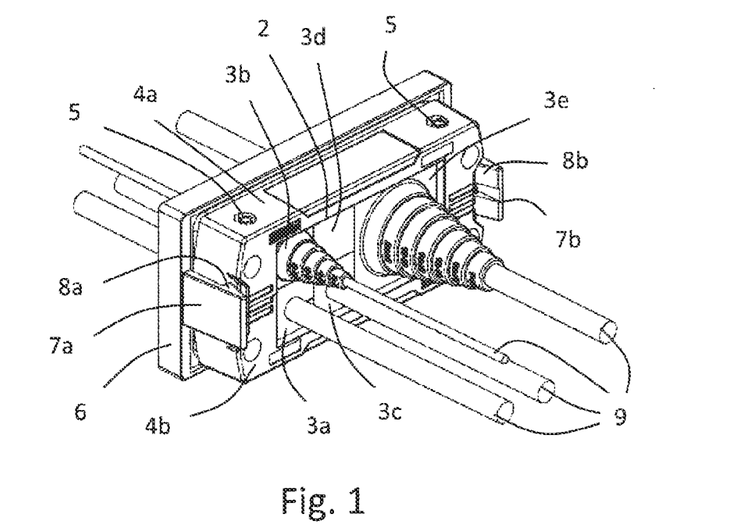
FIG. 1 shows a schematic view of a cable feedthrough according to an embodiment of the invention.

FIG. 1 shows an embodiment of a cable feedthrough according to the invention. The cable feedthrough is formed from a frame element 1 and a plurality of sealing elements 3a, 3b, 3c, 3d, 3e arranged in an inner chamber 2 of the frame element 1, a cable 9 being fed through each of the sealing elements 3a, 3b, 3c, 3d, 3e. The frame element 1 has a rectangular shape. The frame element 1 is formed from two frame parts 4a, 4b, which are connected to each other in the embodiment shown in FIG. 1 by means of screws 5. The two frame parts 4a, 4b enclose the inner chamber 2 of the frame element 1. The sealing elements 3a, 3b, 3c, 3d, 3e are thus framed by the frame parts 4a, 4b such that the sealing elements 3a, 3b, 3c, 3d, 3e are arranged between the frame parts. Each sealing element 3a, 3b, 3c, 3d, 3e is thus arranged in the inner chamber 2 of the frame element 1 adjacent to a frame part 4a, 4b and/or another sealing element 3a, 3b, 3c, 3d, 3e. The sealing elements 3a, 3b, 3c, 3d, 3e arranged next to each other thus likewise form a rectangle. The sealing elements 3a, 3b, 3c, 3d, 3e are substantially held in the frame element 1 by a press-fit, the press-fit being brought about by the screws 5 when connecting the frame parts 4a, 4b. The frame element 1, together with the sealing elements 3a, 3b, 3c, 3d, 3e arranged inside it, is fixed to a wall 6, for example a wall of a control cabinet, in the region of a breakthrough in the wall 6. For this purpose, the frame element 1 can be fixed to the wall 6 by means of screws and a locking mechanism. The locking mechanism here is in the form of two locking arms 7a, 7b, which engage behind the frame element 1 by means of locking hooks 8a, 8c and hold it against the wall 6.

Figure 2:
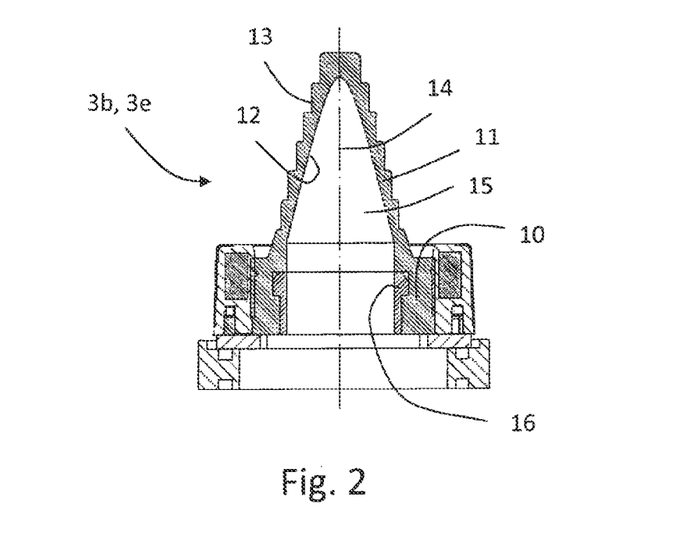
FIG. 2 shows a schematic view of a section through a sealing element with a stabilisation element according to an embodiment of the invention.

FIG. 2 shows an embodiment of a sealing element 3b, 3e, as is also provided for two of the sealing elements shown in FIG. 1. In FIG. 2 the sealing element 3b, 3e is shown in a cross-sectional view. The sealing element 3b, 3e is formed from a base body 10 and a conical cable bushing 11 formed on the base body 10. The base body 10 and the cable bushing 11 are formed together as one part. The base body 10 has a rectangular circumferential surface, as can be seen in FIG. 1. The conical cable bushing 11 has a conical inner surface 12 and an outer surface 13, which has a plurality of gradated stepped regions with diameters of different sizes. In order for the sealing element 3b, 3e to rest tight against a cable 9, one or more of the gradated stepped regions of the conical cable bushing 11 can be severed according to the outer diameter of the cable 9 introduced into the sealing element 3b, 3e.

Figure 8:
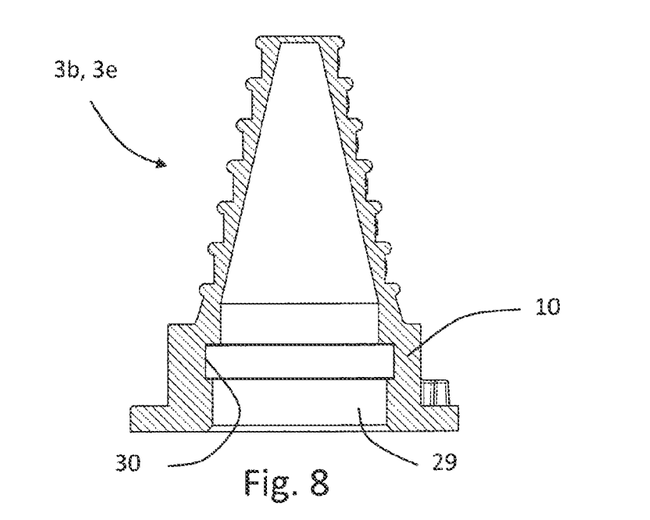
FIG. 8 shows a schematic sectional view of the sealing element shown in FIG. 2 without a stabilisation element.

Inside the sealing element 3b, 3e, a passage 15, via which the cable 9 is fed through the sealing element 3b, 3e, extends along the longitudinal axis 14 of the sealing element 3b, 3e as shown in FIG. 1. In the region of the base body 10, the passage 15 is circular and in the region of the conical cable bushing 11, the passage 15 is conical. Inside the base body 10 in the region of the passage 15 a tubular stabilisation element 16 is arranged, which forms the outer wall of the passage 15 inside the base body 10 along a certain region. In FIG. 8 this sealing element 3b, 3e is shown without a stabilisation element 16, it being possible to see a receiving chamber 29 inside the base body 10 of the sealing element 3b, 3e, inside which the stabilisation element 16 can be inserted. The receiving chamber 29 has an annular groove 30, which is formed on the inner surface of the base body 10. The stabilisation element 16 can hook into the annular groove 30 to fix it inside the receiving chamber 29 of the base body 10.

Figure 3:
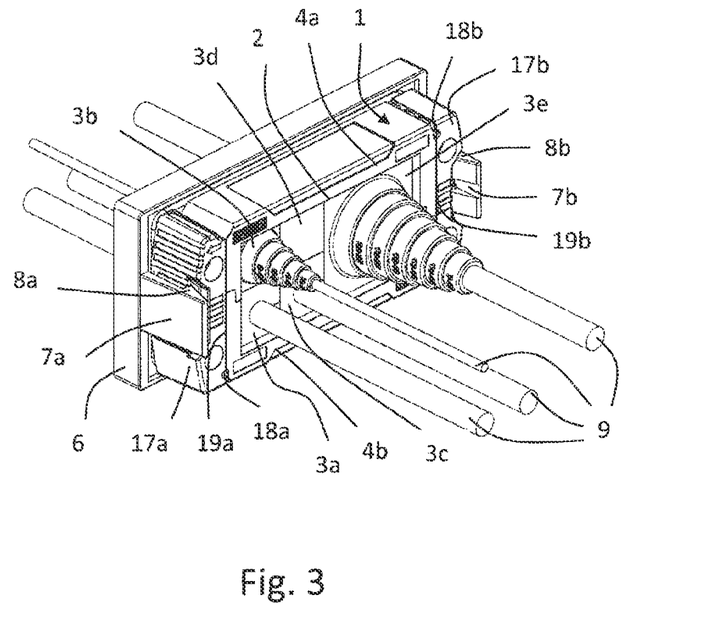
FIG. 3 shows a schematic view of a cable feedthrough according to an embodiment of the invention.

In FIG. 3 another embodiment of a cable feedthrough according to the invention is shown. The embodiment shown in FIG. 3 substantially corresponds to the embodiment shown in FIG. 1, the only difference being in the construction of the connection of the frame parts 4a, 4b to each other. In the embodiment shown in FIG. 3, the two frame parts 4a, 4b are not connected to each other by means of screws, but rather by means of two braces 17a, 17b, which are arranged so they can each move pivotally on one of the two frame parts 4a, 4b by means of an articulated joint 18a, 18b. The two braces 17a, 17b are arranged on opposite transverse lateral surfaces 19a, 19b of the frame element 1, the brace elements 17a, 17b forming an extension of the frame element 1 in its longitudinal expansion but not affecting the height of the frame element 1. In order to separate the two frame parts 4a, 4b from each other, the brace elements 17a, 17b are pivoted away from the respective transverse lateral surfaces 19a, 19b of the frame element 1. To connect the two frame parts 4a, 4b to each other the brace elements 17a, 17b are pivoted towards the respective transverse lateral surfaces 19a, 19b, of the frame element 1 again. The activation of the brace elements 17a, 17b can be carried out by hand, without the assistance of a tool.

In FIGS. 4 to 7 a sealing element 3b, 3e as already shown in FIGS. 1 to 3 is shown with a base body 10 and a conical cable bushing 11 in various views.

Figure 4:
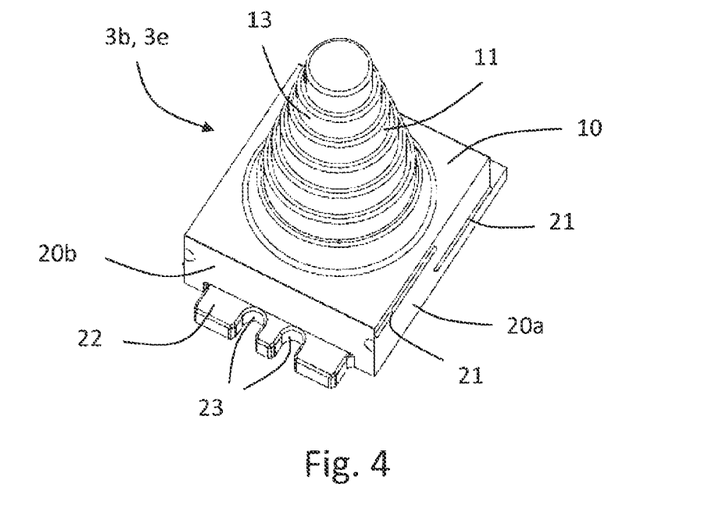
FIG. 4 shows a schematic view of a sealing element according to an embodiment of the invention.
Figure 5:
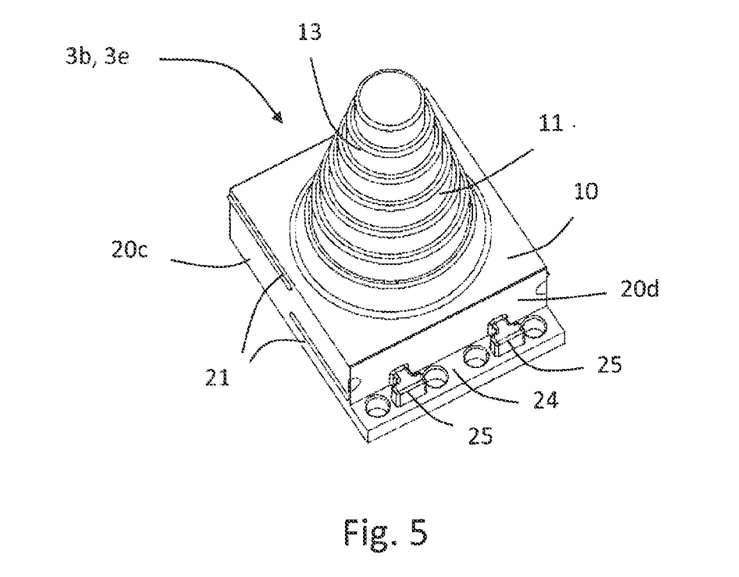
FIG. 5 shows another schematic view of a sealing element according to an embodiment of the invention.

FIG. 4 shows the seal element 3b, 3e in a perspective plan view onto the upper side of the sealing element 3b, 3e. It can be seen in the process that a first fixing region with two webs 21 is formed on a lateral surface 20a of the base body 10. Furthermore, on a second lateral surface 20b of the base body 10 a second fixing region is formed, which has a plate 22 with two recesses 23 formed on the base body 10. By means of these two fixing regions formed on the respective lateral surfaces 20a, 20b, the sealing element 3b, 3e can be fixed to the frame element 1 or the frame parts 4a, 4b of the frame elements and/or to the adjacent sealing elements 3a, 3b, 3c, 3d, 3e FIG. 5 shows another sealing element 3a, 3e in a perspective plan view onto the upper side of the sealing element 3b, 3e. The sealing element 3b, 3e shown here has a lateral surface 20c of the base body 10, on which likewise a first fixing region is formed, which has two web elements 21. On another lateral surface 20d of the base body 10, a third fixing region is formed, which has a plate 24 formed on the base body 10 with two domes 25, which can engage into the recesses of a sealing element 3a, 3b, 3c, 3d, 3e arranged next to it and/or the frame parts 4a, 4b of the frame element 1.

Figure 6:
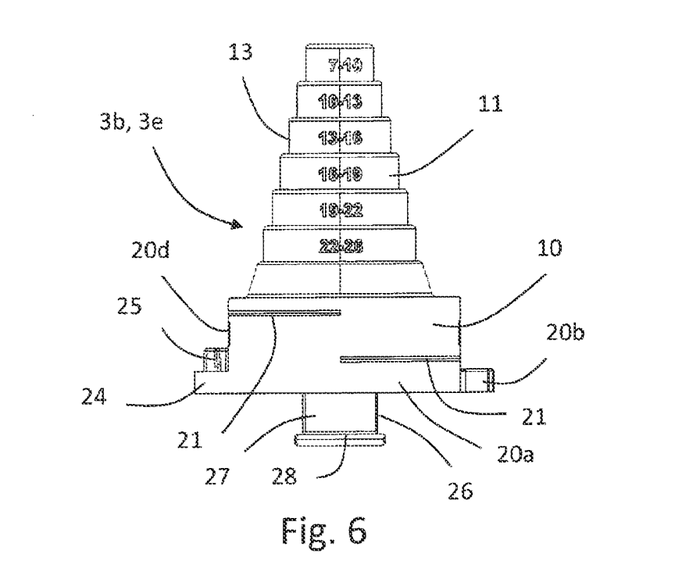
FIG. 6 shows another schematic view of a sealing element according to an embodiment of the invention.

In FIG. 6 a sealing element 3b, 3e is shown in a plan view onto a longitudinal lateral surface of the sealing element 3b, 3e. It can be seen here that the gradated stepped regions on the outer surface 13 of the conical cable bushing 11 are marked with diameters, which correspond to the outer diameters of a cable 9 to be inserted. As a result, the cable assembly operative can quickly and easily see which gradated stepped regions he has to sever in order for it to be possible to arrange the cable 9 to be inserted tightly inside the sealing element 3b, 3e.

In the embodiment shown in FIG. 6, the base body 10 has different fixing regions on each of its lateral surface regions 20a, 20b, 20d, two web elements 21 being formed on the lateral surface 20a, a plate 22 with recesses on lateral surface 20b, and a plate 24 with domes 25 on lateral surface 20d.

Furthermore, a cable strain relief 26 can be seen in FIG. 6 with a web 27, on the free end of which a projecting lug or hook 28 is formed, which protrudes from the underneath of the sealing element 3b, 3e.

Figure 7:
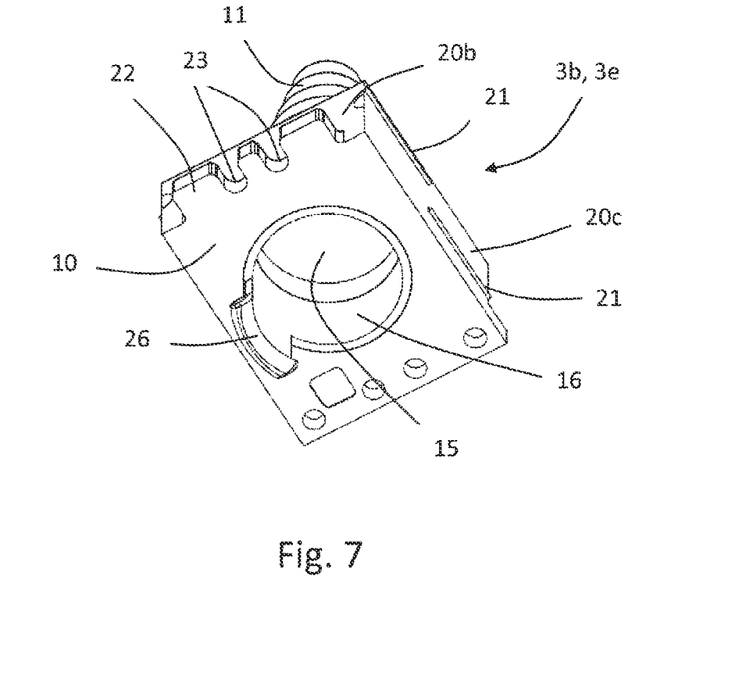
FIG. 7 shows another schematic view of a sealing element according to an embodiment of the invention.

In FIG. 7, the sealing element 3b, 3e shown in FIG. 6 is shown in a perspective view onto the underneath of the sealing element 3b, 3e. In the process it can be seen that the cable strain relief 26 is formed as one part with the tubular stabilisation element 16.

Figure 9:
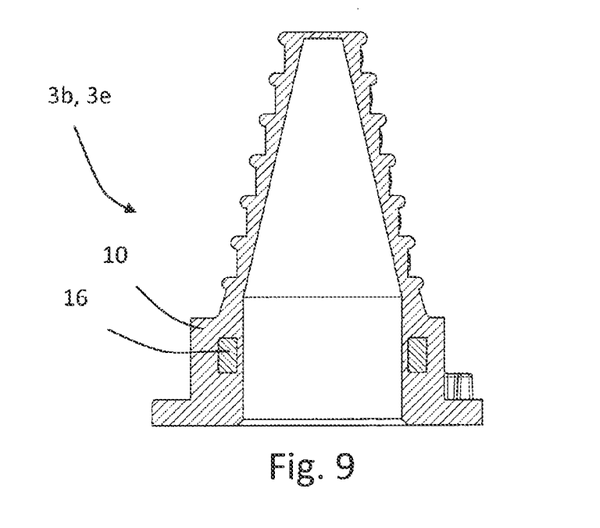
FIG. 9 shows a schematic view of a section through a sealing element with a stabilisation element according to another embodiment of the invention.

In FIG. 9, another embodiment of a sealing element 3b, 3e with a tubular stabilisation element 16 is shown, the stabilisation element 16 being overmoulded here by the material of the sealing element 3b, 3e. In the case of this embodiment, the sealing element 3b, 3e can be produced in a two-component injection moulding process together with the stabilisation element 16.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Frame element 1
Inner chamber 2
Sealing element 3a, 3b, 3c, 3d, 3e
Frame part 4a, 4b
Screw 5
Wall 6
Locking arm 7a, 7b
Locking hook 8a, 8b
Cable 9
Base body 10
Conical cable bushing 11
Inner surface 12
Outer surface 13
Longitudinal axis 14
Passage 15
Stabilisation element 16
Brace element 17a, 17b
Articulated joint 18a, 18b
Transverse lateral surface 19a, 19b
Lateral surface 20a, 20b, 20c, 20d
Web element 21
Plate 22
Recess 23
Plate 24
Dome 25
Cable strain relief 26
Web 27
Lug 28
Receiving chamber 29
Annular groove 30

The invention claimed is:

1. A cable feedthrough comprising:
a frame element including at least two frame parts configured to form an outer surface of the frame element when connected together, the frame element forming an inner chamber delimited by the frame parts; and
a sealing element disposed in the inner chamber, lying adjacent to at least one of an additional sealing element or at least one of the frame parts, and fixed in the frame element by a press fit, the sealing element including:
a base body with a passage configured to receive a cable therethrough, and
a conical cable bushing formed on the base body to extend the passage, the conical bushing including gradated stepped regions having diameters of different sizes,
wherein the base body of the sealing element includes a first fixing region including a plate formed on the base body that has at least one dome, the first fixing region configured to fix the base body of the sealing element to at least one of a base body of the additional sealing element or one of the frame parts.

2. The cable feedthrough as recited in claim 1, wherein the base body includes a tubular stabilisation element disposed in the passage.

3. The cable feedthrough as recited in claim 2, wherein the sealing element includes a cable strain relief formed on at least one of the base body or the tubular stabilization element.

4. The cable feedthrough as recited in claim 1, wherein the sealing element is formed from at least one of a thermoplastic polymer or an elastomer.

5. The cable feedthrough as recited in claim 1, wherein the base body of the sealing element includes a second fixing region including a web element, the second fixing region configured to fix the base body of the sealing element to at least one of the base body of the additional sealing element or one of the frame parts.

6. The cable feedthrough as recited in claim 1, wherein the base body of the sealing element includes a second fixing region including a plate formed on the base body that has at least one recess, the second fixing region configured to fix the base body of the sealing element to at least one of the base body of the additional sealing element or one of the frame parts.

7. The cable feedthrough as recited in claim 1, wherein the base body of the sealing element includes a second fixing region including a web element, and a third fixing region including a second plate formed on the base body, the second fixing region and the third fixing region being configured to fix the base body of the sealing element to at least one of the base body of the additional sealing element or one of the frame parts.

8. The cable feedthrough as recited in claim 7, wherein the base body of the sealing element includes a third fixing region including a plate formed on the base body that has at least one dome, the third fixing region being configured to fix the base body of the sealing element to at least one of the base body of the additional sealing element or one of the frame parts.

9. The cable feedthrough as recited in claim 1, wherein the frame parts are connected by at least one screw.

10. The cable feedthrough as recited in claim 1 further comprising a brace element disposed on at least one of the frame parts in an articulated manner, the brace element connecting the frame parts to one another.

11. A method for assembling a cable feedthrough, the method comprising:
    providing a sealing element including:
    a base body including a passage;
    a conical cable bushing formed on the base body that extends the passage, the conical cable bushing including gradated stepped regions having diameters of different sizes;
    shortening, by severing at least one of the gradated stepped regions, the conical cable bushing based on an outer diameter of a cable configured to be fed through the passage and into the sealing element;
    introducing the cable into the sealing element through the passage of the sealing element;
    arranging the cable-introduced sealing element on a frame part; and
    connecting the frame part and at least one additional frame part to form a frame element such that the sealing element is disposed in an inner chamber of the frame element, the inner chamber being delimited by the frame parts so as to retain the sealing element in the frame element by a press fit relationship between the sealing element and the frame element, the frame parts being configured to form an outer surface of the frame element when connected together,
    wherein the base body of the sealing element includes a fixing region including a plate formed on the base body that has at least one dome, the fixing region configured to fix the base body of the sealing element to at least one of a base body of an additional sealing element or one of the frame parts.

12. A cable feedthrough comprising:
    a frame element including at least two frame parts configured to form an outer surface of the frame element when connected together, the frame element forming an inner chamber delimited by the frame parts; and
    a sealing element disposed in the inner chamber, lying adjacent to at least one of an additional sealing element or at least one of the frame parts, and fixed in the frame element by a press fit, the sealing element including:
    a base body with a passage configured to receive a cable therethrough, and
    a conical cable bushing formed on the base body to extend the passage, the conical bushing including gradated stepped regions having diameters of different sizes,
    wherein the base body of the sealing element includes a first fixing region including a web element, and a second fixing region including a plate formed on the base body, the first fixing region and the second fixing region being configured to fix the base body of the sealing element to at least one of a base body of the additional sealing element or one of the frame parts.

* * * * *